United States Patent [19]
Desautels et al.

[11] Patent Number: 5,573,477
[45] Date of Patent: Nov. 12, 1996

[54] METHOD AND APPARATUS FOR ASSISTING IN SHIFTING TRANSMISSION TO NEUTRAL

[75] Inventors: Thomas Desautels, West Bloomfield; Edward M. Bacon, Northville; Steve M. Weisman, Farmington Hills, all of Mich.

[73] Assignee: Rockwell International Corporation, Pittsburgh, Pa.

[21] Appl. No.: 508,155

[22] Filed: Jul. 27, 1995

[51] Int. Cl.$^6$ .................................................. B60K 41/08
[52] U.S. Cl. ............................................................. 477/109
[58] Field of Search ...................................... 477/109, 110, 477/111

[56] References Cited

U.S. PATENT DOCUMENTS

| | | | |
|---|---|---|---|
| 4,593,580 | 6/1986 | Schulze | 477/110 |
| 5,487,004 | 1/1996 | Amsallen | 477/109 |

*Primary Examiner*—Dirk Wright

[57] ABSTRACT

An operator of a vehicle may request torque reduction on the connection between a transmission and an engine, or may use a clutch. A switch is provided to send a torque elimination request. Upon receiving the request, an engine control adjusts engine fueling to achieve a zero torque load on a transmission to allow an operator to shift the transmission to neutral without clutching. The engine control predicts the engine fueling to achieve a zero torque load, and begins adjusting fueling to approach that predicted value. The prediction of the zero torque value is based on system variables other than torque load. Since the actual zero torque fueling varies, it is difficult to measure or predict. Moreover, a torque meter for measuring actual torque is expensive and difficult to maintain. The present invention addresses this difficulty by adjusting the engine fueling above and below the predicted zero torque value. In this way, the actual engine fueling will repeatedly cross the actual zero torque value such that the operator will be able to move the transmission out of gear to a neutral position.

20 Claims, 1 Drawing Sheet

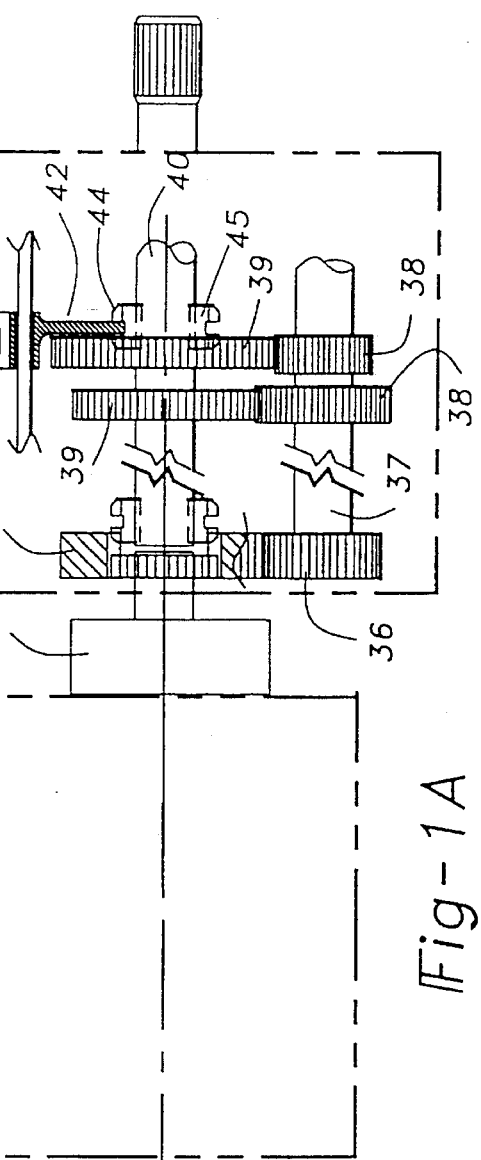
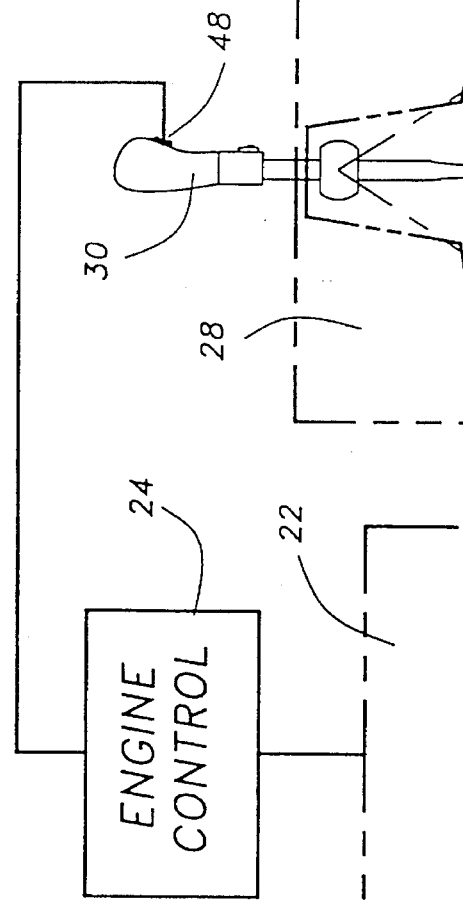
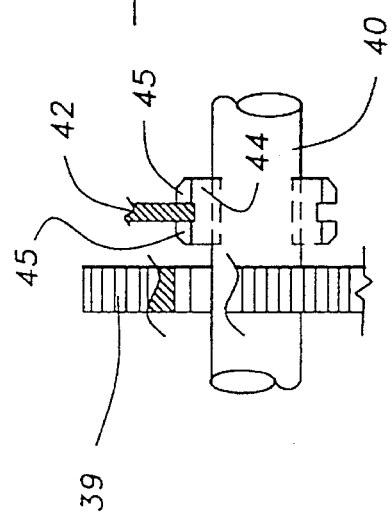
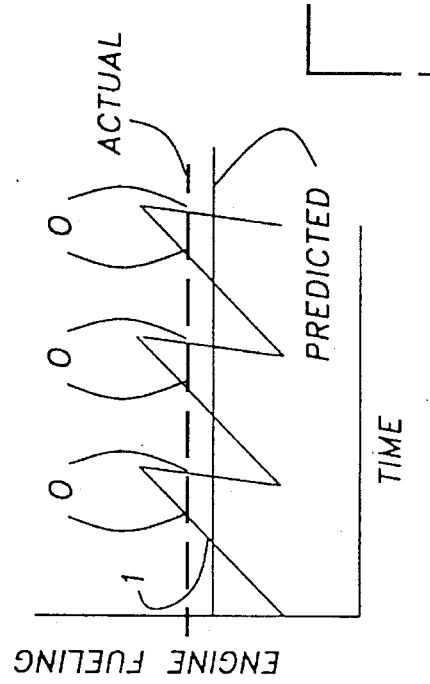

5,573,477

METHOD AND APPARATUS FOR ASSISTING IN SHIFTING TRANSMISSION TO NEUTRAL

BACKGROUND OF THE INVENTION

This invention relates to an engine control that breaks the torque lock typically found in a transmission with engaged gears, allowing the transmission to be moved to neutral without actuating the clutch.

Heavy vehicles, such as trucks typically have an engine driving the wheels of a vehicle through a multi-speed transmission. The transmission is moveable through several speed ratios at the control of a manual stick shift.

A manual transmission typically slides toothed members relative to different gears to engage one of the gears. To complete a shift, the operator must first typically move the gear that is presently-engaged out of engagement to a "neutral" position. In the "neutral" position, the transmission does not engage any gear, and thus rotational drive is not transmitted to the transmission output shaft from the engine shaft.

This movement from an engaged position to a neutral position occurs while drive is being transmitted. The toothed member moves to effect this change. When the transmission is engaged and rotational drive is being transmitted from the engine to the transmission, there is a large torque load holding the gears and the toothed member at a particular axial position. This torque load makes it quite difficult for an operator to manually move the toothed member out of engagement. This so-called "torque lock" typically makes it impossible to move a transmission to neutral without somehow reducing the torque load. To this end, vehicles with manual transmissions are equipped with clutches. An operator actuates the clutch which breaks the drive transmission from the engine to the transmission. The torque load goes to zero, and the operator is able to move the gear out of engagement.

In the heavy vehicle industry, the operation necessary to complete a shift between gears is relatively complicated. Typically, a driver must actuate the clutch, and then begin modifying the engine speed through the accelerator to synchronize engine speed to a speed necessary for the next speed ratio to be engaged. At the same time, the operator must manually move the gear shift lever to engage the gear in the proper new gear. These procedures become more burdensome when a driver is rapidly shifting through several sequential gear changes.

Recently, heavy vehicles have become equipped with more and more controls that require operator-intensive operations. At the same time, the experience level of operators is decreasing. Thus, it would be desirable to reduce the steps an operator must make on a routine basis when driving. To this end, it would be desirable to allow the operator to move the gear out of engagement for a shift without having to actuate the clutch.

One prior system proposed achieving a zero torque load by measuring the actual torque, and controlling the engine to attempt to reach a zero torque load. This proposed system would be too complex to be practical. The placement of the torque meter would be costly and lead to frequent repairs. Moreover, an exact measurement of the zero torque value would be difficult to utilize, as it changes with time. Finally, this proposed system does not allow an operator the option of not using the torque-breaking feature and relying upon clutch operation.

SUMMARY OF THE INVENTION

In a disclosed embodiment of this invention, a vehicle drive incorporates an engine driving the vehicle through a multi-speed transmission. The engine is provided with an electronic control unit for controlling the engine. The transmission is controlled by a manual stick shift which moves toothed members into and out of engagement with selected gears to change the transmission speed ratios.

In one embodiment of this invention, the engine vehicle drive is also provided with a standard clutch. The operator is allowed the option of utilizing the clutch or actuating the torque elimination feature. Preferably, the operator is provided with an indication switch to request that the torque load on the transmission be eliminated such that the operator may move the transmission to neutral.

In one embodiment of this invention, the electronic control unit predicts an engine parameter, such as fueling, necessary to achieve a zero torque load on the transmission based on several operating variables. The system does not attempt to read the zero torque fueling, but rather to predict it. Once a predicted engine fueling to achieve zero torque load is known, the engine control moves the engine fueling toward that predicted value.

In one preferred embodiment of this invention, the engine parameter is "dithered" or varied above and below the predicted zero torque value. In a most preferred embodiment, a profile of the fueling is a saw tooth shape extending above and below the predicted zero torque value. The actual zero torque fueling is difficult to determine, and can change with time. Thus, the prior art system which simply attempts to read a zero torque value are not practical. With the inventive variation above and below the predicted zero torque value there will be repeated crossing points of an actual zero torque fueling value. At those points, the operator will be able to easily move the gear out of engagement.

In a method of operating a vehicle to begin a gear shift according to the present invention, the operator actuates the torque elimination system switch. The engine controller then utilizes several variables to predict a zero torque engine fueling. Once a zero torque fueling is predicted, engine fueling is driven towards that amount. The transition from operator control to torque reduction is preferably ramped at a constant slope. Once the engine fueling is close to the predicted amount, it is varied above and below the predicted value. The operator engages the stick shift and urges the gear out of engagement to begin a shift. As the engine speed crosses the actual zero torque value, the operator will be able to easily move the gear out of engagement.

In a most preferred embodiment of this invention, the above features are incorporated into an engine control that also predicts the engine speed that will be necessary at the gear to which the operator is shifting the transmission. After the transmission has moved out to neutral, the engine control begins to change the engine speed to a value synchronized with the speed necessary to actuate a smooth transition to the next transmission gear. The operator will also be able to re-engage the gear without clutching.

These and other features of the present invention will be best understood from the following specification and drawings, the following of which is a brief description.

BRIEF DESCRIPTION OF THE DRAWINGS

FIG. 1A is a schematic view of a drive system for a vehicle.

FIG. 1B shows a portion of the system shown in FIG. 1A in neutral.

FIG. 2 is a graph explaining the torque elimination feature of the present invention.

DETAILED DESCRIPTION OF A PREFERRED EMBODIMENT

A drive for a vehicle 20 is illustrated in FIG. 1A. An engine 22 includes an electronic control unit 24 which controls the output speed of the engine. Control 24 will typically control the amount of fuel delivered to the engine to regulate the output speed and torque. Engine 22 has an output shaft 23 that passes through a clutch 26 to drive a multi-speed transmission 28. The transmission 28 may be of any type known in the art.

A manual stick shift 30 is operable to shift the transmission 28 between any one of several speed ratios. Transmission 28 includes a gear 32 which is driven by the output of the engine 22 when the clutch 26 is closed. Gear 32 engages and drives a pair of gears 36 each mounted on a countershaft 37. Only one gear 36 and countershaft 37 are shown.

Countershaft 37 rotates several gears 38, only two of which are shown. Gears 38 engage and rotate a plurality of gears 39 that are mounted to freely rotate on a main output shaft 40. A shift yoke 42 slides a shift collar 44 as directed by the vehicle operator to change the speed ratio of the transmission 28. In the illustrated transmission, collar 44 is internally splined to rotate with shaft 40, but may slide axially along shaft 40. Collar 44 also has external teeth 45 that are selectively received within an inner peripheral bore on a gear 39. When the shift collar 44 is in the position shown in FIG. 1A, the teeth 45 engage the gear 39 such that the gear 39 rotates the collar 44, and hence the shaft 40. Thus, in the position shown in FIG. 1 A, the engine drives the gear 32, which drives gears 36 and counter-shafts 37. The counter-shafts 37 drive the gears 38, which drive the gears 39.

Since the collar 44 is engaged to rotate with one gear 39, then the shaft 40 will be rotated at a speed which is dependent on the gear reduction at the selected gear 39. When one wishes to shift the transmission to another speed, another gear 39 is selected and engaged. By varying the gear reductions between the several gears 39, transmission 28 is able to selectively achieve several distinct output speed ratios for shaft 40 relative to input from engine 22.

In moving the collar 44 to shift to another speed ratio, the initial step is to move the teeth 45 out of engagement from the inner peripheral bore of the gear 39. When the drive train 20 is transmitting rotation to the shaft 40 through the arrangement as shown in FIG. 1A, however, there is a high torque load on the connection between the teeth 45 and the gear 39 and between collar 44 and shaft 40. This high torque load makes it difficult, if not impossible, for an individual to manually slide the collar 44 relative to the gear 39. For this reason, vehicles have traditionally incorporated a clutch 26. An operator who wishes to shift a transmission to a new speed, initially actuates the clutch. This breaks the torque transmission discussed above, and allows the operator to disengage the transmission and move to neutral.

As discussed above, it is an object of this invention to allow an operator to shift the transmission to a new speed without operating the clutch. To achieve the ability to shift the gear without clutching, the present invention incorporates a switch 48 on the shift knob 30. This switch 48 is utilized to request torque elimination or to eliminate the torque lock preventing sliding movement of the collar 44 from the position shown in FIG. 1A.

When an operator actuates switch 48, a signal is sent to ECU 24 requesting a zero torque load on the connection between the engine 22 and transmission 28. Once the zero torque load is achieved, the operator may easily slide the collar 44 to the neutral position as is shown in FIG. 1B.

The present invention improves upon prior suggestions to eliminate torque for a disengagement of a clutch in several respects. First, the operator is able to request the torque elimination function. In past proposals, a torque elimination feature begins as the operator moves the shift knob. Since the operator of the inventive system requests the torque elimination function, the operator is still free to selectively use the clutch 26. As an example, an operator may choose to use the break torque function when rapidly shifting through several speed ratios, but may rather use the clutch to eliminate the torque lock when speed ratios are shifted more infrequently.

In addition, the prior art has attempted to measure the torque load actually being applied, and then attempt to control the engine to achieve a zero torque load. This is inefficient, impractical, and also requires a relatively long period of time. The present invention achieves torque elimination by predicting what an actual zero torque engine parameter would be, and then achieving that predicted zero torque engine parameter. Typically, engine fueling is varied.

The predicted zero torque value is calculated based upon several vehicle operation variables weighted by constants. The determination of the constants can be achieved by real world testing of the particular model that is to incorporate the electronic control unit, and could vary with the engine transmission or other system components.

In a most preferred embodiment of this invention, the predicted zero torque speed is determined as follows:

predicted zero torque value =friction torque component + unbalanced torque component +cold torque adjustment +fan loss adjustment +an air conditioning load value +dither torque + torque offset.

The friction torque component is a function of the engine speed, and is determined from a tabulated look-up table of the friction influence at various engine speeds. The friction torque component is the main component of the predicted zero torque speed. The component includes an amount arrived at for a particular engine speed. The look-up table would be prepared by driving an engine with a torque gauge on the output of the engine, and varying the engine speed. The torque is read and the table is prepared assuming other variables to be constant.

The unbalanced torque is defined by the engine inertia multiplied by the gear ratio at the presently-engaged gear, multiplied by the acceleration of the transmission output. Preferably, acceleration of the speed of the transmission output is filtered using an acceleration filter constant. The engine inertia factor is determined by running the engine with the transmission in neutral at a high speed and then releasing the accelerator. The effect of this acceleration on the torque is then used to determine the engine inertia factor.

The cold temperature adjustment takes into account that the torque required to drive a cold engine will be greater than a warm engine. The oil is more viscous when cold. The cold torque adjustment includes a constant multiplied by the oil temperature, multiplied by a factor related to engine speed. The engine speed factor may be the squared of the engine speed, or the relationship could be linear. Most preferably, it is a linear relationship.

The fan loss is also determined by a constant times a factor related to the engine speed. This factor may be the engine speed squared, or could be a linear factor. Most preferably, the relationship is squared. If the fan is off, this component is set at zero.

The air conditioning load value may be a constant determined by running the engine with the air conditioning on and determining the additional torque required to power the air conditioner. The air conditioning load constant may be added or not added depending on whether the ECU senses the air conditioning is on or off. Alternatively, the air conditioning load might also be dependent on speed in some applications.

The constants involved for the cold temperature adjustment and the fan loss are also determined by maintaining all other variables constant and determining the torque as the particular variables change. In this way, the constants are determined and programmed into the electronic control unit.

The dither factor incorporates a variation above and below the predicted value as discussed above.

Preferably, the dither value varies a small percentage of the predicted value (in one example four percent) both below and above the predicted value. Most preferably, the dither is incorporated into the engine fueling in a saw tooth fashion, such that the engine speed begins on one side of the predicted value, moving up from the greatest amount of dither to cross the predicted engine speed, and then continues on a single slope to the other extreme. The engine fueling then returns to the initial point such that the profile of the engine fueling has a ramp on a front end and then a direct downward component on the other end as shown in FIG. 2. In this way, the profile will cross the actual zero torque value more frequently. As an example, as shown in FIG. 2, the profile repeatedly crosses the actual zero torque value at points 0. If the front end of the profile did not recently cross the actual zero torque value, it is unlikely that simply returning the profile back at an angle towards the lower-most point, would result in a crossing of the zero torque value until near the end of the ramp. Stated another way, if the end of the ramp labeled "1" does not cross the actual zero torque value above the predicted value, it is unlikely that the return, if ramped, would cross the zero torque value until it reached below the predicted value. For that reason, the actual saw tooth shape utilized in this invention that returns the profile directly downwardly to its initial point, after reaching the upper-most point, is most likely to have frequent crossings of the zero torque value. A look-up table is used to obtain the changing dither amounts.

Preferably, the dither factor is only utilized when one gets close to the predicted value. As one alternative, a "blip" may be utilized immediately after receipt of the request for torque elimination. The blip would increase the torque load momentarily, then drop the torque load down to include the dither value and the transition towards the predicted zero torque value. This blip would assist in moving the system to a condition such that the zero torque value would not require a negative fueling. A negative fueling is of course not possible, and thus by utilizing the blip, the possibility of a negative fueling requirement may be eliminated.

In addition, it may be desirable that the transition from the operator control to the zero torque value not be achieved with constant change, but rather that an exponential decay be utilized. The exponential decay may have some beneficial results in achieving the actual zero torque value more rapidly. After a set time, the dither is actuated as described above. The time constant before ending the exponential decay and beginning the dither, and also the frequency of the dither may vary with the gear ratio. Moreover, those factors may vary with the range of the transmission.

As an alternative to the saw tooth profile, a ramp up and then a ramp back down, or sinusoidal relationship may be utilized.

Finally, the time between the initiation of the torque reduction and the beginning of the dithering may also vary with the amount of driver force on the accelerator. If the driver is accelerating the vehicle when the control switches to the ECU from the driver, there is typically a high torque load at the initiation of the torque reduction. In such a case, it may be desirable to not start dithering for a relatively long period of time compared to situations where there is a lower torque load.

The torque offset factor is a set amount that is offset from the calculated value using the above formula. If the final system with the variables and constants calculated as described above has an offset above or below the actual torque value, the torque offset factor is added to bring the predicted value closer to the actual torque values. The offset is determined experimentally once the other components have been calculated. Moreover, the offset preferably results in a reduction in vehicle speed, rather than an increase in vehicle speed. Although it is anticipated that the transmission will be moved out of gear to neutral soon after the torque elimination is requested, while the torque elimination is ongoing the transmission is still in gear. As such, it would be preferable to err on the lower side rather than a high side if there is some question as to which of the two would bring the actual fueling closer to the zero torque fueling.

One main feature of the present invention is the realization that a predicted or measured zero torque fueling will often be inaccurate. Moreover, the zero torque engine fueling changes with time, and any measurement or calculation will possibly be inaccurate by the time the actual engine fueling has been adjusted. The present invention recognizes and addresses this problem by varying the engine fueling above and below the predicted zero torque value.

Thus, an operator requests the torque elimination feature through button 48. The ECU 24 varies the engine fueling as shown in FIG. 2. The operator applies force to the manual stick shift 30, attempting to move the collar 44 and disengage the gear. As the actual engine fueling saw tooth profile crosses the actual zero torque value, the operator will be able to disengage the collar. A signal is then sent to the ECU that the transmission is in neutral. Once a signal is received that the transmission is in neutral, control is either returned to the operator or an engine synchronization system as described generally in this application is then actuated to synchronize the speed to that which will be necessary at the next expected gear.

During the modification of the engine fueling as shown in FIG. 2, a timer is actuated. After a predetermined period of time, if a neutral signal has not been received, the torque elimination feature is canceled. The torque elimination feature is canceled once a signal is received that the transmission is in neutral. In addition, the torque elimination feature is canceled should the clutch 26 be actuated.

Modern engine controls can achieve the above-described control parameters very quickly. All of the above calculations and speed modifications can be performed in a fraction of a second. Known transition rate algorithms are used to achieve the desired values of engine speed. A known engine control such as an electronic control unit available from Detroit Diesel Corporation or the trade name DDEC III may be easily modified to achieve the features of the present invention.

In addition, after the transmission is in the position shown in FIG. 1B, the operator must now engage a new selected gear. The present invention is preferably utilized with a system that then synchronizes engine speed with the speed necessary for a smooth transition to the new transmission speed. This system utilizes an operator prediction of whether the next gear shift will be an upshift or a downshift, determines the next gear ratio, and calculates what the engine synchronization input speed should be at that next gear ratio. The speed is then driven to that speed. This system allows the engagement of the next selected gear without actuation of the clutch. Other aspects of the proposed system are disclosed in co-pending U.S. patent application Ser. No. 08/508,135 entitled "Engine Speed Synchronization System for Assisting a Manual Transmission Shift;" U.S. patent application Ser. No. 08/508,067 entitled "Two-Position Neutral Switch for Multi-Speed Transmission;" U.S. patent application Ser. No. 08/508,153 entitled "Four-Position Switch for Shift Assist System;" U.S. patent application Ser. No. 08/507,996 entitled "Automatic Range Shift for Multi-Speed Transmission;" U.S. patent application Ser. No. 08/508,307 entitled "Operator Input System for Gear Shift Assist Mechanism;" U.S. patent application Ser. No. 08/508,156 entitled "Engine Speed Retardation for Transmission Upshift;" and U.S. patent application Ser. No. 08/508,156 entitled "Combined System for Assisting Shifting of Manual Transmission Without Clutching." The above-listed patent applications are all filed on even date with the present application.

A preferred embodiment of the present invention has been disclosed in a preferred embodiment. A worker of ordinary skill in this art would recognize, however, that certain modifications would come within the scope of this invention. For that reason, the following claims should be studied to determine the true scope and content of this invention.

We claim:

1. A vehicle drive comprising:
   an engine having an output shaft;
   a transmission selectively connected to said engine output shaft, said transmission having several selectively actuated speed ratios, said transmission having a transmission output shaft, said selected speed ratios controlling the ratio of the input speed from said engine output shaft to the output speed of said transmission output shaft; and
   an engine control to control a parameter of said engine, said engine control including an operator input to allow an operator to signal a desire to eliminate torque between said engine output shaft and said transmission output shaft, said operator signal requesting said engine control determine a zero torque parameter value for said engine output shaft that approximates a zero torque load on the connection between said engine and said transmission, and said engine control being operable to control said engine to achieve said zero torque parameter value.

2. A vehicle drive as recited in claim 1, wherein said engine parameter is the amount of fuel delivered to said engine.

3. A vehicle drive as recited in claim 1, wherein said zero torque parameter value is a predicted value based at least in part on a sensed engine speed.

4. A vehicle drive as recited in claim 3, wherein said control is operable to vary said engine parameter above and below said predicted zero torque value as a function of time.

5. A vehicle drive as recited in claim 4, wherein said engine parameter is controlled to move above and below said predicted value with a saw tooth profile.

6. A vehicle drive as recited in claim 3, wherein said predicted value includes a component calculated based upon an acceleration value for the transmission output shaft.

7. A vehicle drive as recited in claim 6, wherein the predicted zero torque parameter includes a component based upon oil temperature of the engine.

8. A vehicle drive as recited in claim 1, wherein said engine control also controls the speed of said engine after said transmission has been moved to a neutral position by predicting a synchronizing speed for said engine output shaft at the next speed ratio for said transmission, and said engine control being operable to change said engine speed to achieve said synchronizing speed.

9. A vehicle drive as recited in claim 1, wherein a manual stick shift allows an operator manually shift said transmission speed ratios.

10. A vehicle drive as recited in claim 9, wherein a selectively actuated clutch is disposed between said transmission and said engine output shaft.

11. A method of operating a vehicle drive comprising the steps of:
   a. providing an engine, an engine fuel control, a transmission driven by an output shaft of said engine, said transmission being provided with several selectively actuated speed ratios, and an operator input switch to indicate a desire to eliminate torque on said transmission and allow the operator to move said transmission to begin a speed ratio shift;
   b. indicating a desire to eliminate torque by actuating said input switch;
   c. determining a zero torque fuel to reduce the torque load between said engine and said transmission;
   d. modifying said engine fueling by said controller to achieve said zero torque fuel value; and
   e. manually moving said transmission out of engagement to a neutral position.

12. A method as recited in claim 11, including the further steps of predicting the next selected gear ratio after said transmission has been moved to neutral, predicting a synchronizing speed for said engine output shaft at said next selected gear ratio, and using said engine control to begin moving said engine speed towards said synchronizing speed.

13. A method as recited in claim 11, wherein said zero torque fuel value is predicted based upon certain system conditions.

14. A method as recited in claim 13, wherein said engine fueling is adjusted above and below said predicted value as a function of time.

15. A method as recited in claim 13, wherein said zero torque value is predicted based upon engine speed.

16. A method as recited in claim 15, wherein said zero torque value is also predicted based upon the acceleration of the transmission output, the oil temperature of said engine, and the torque necessary to operate a vehicle fan, when the vehicle fan is actuated.

17. A method of operating a vehicle drive comprising the steps of:
   a. providing an engine, an engine parameter control, a multi-speed transmission driven by an output shaft of said engine, said transmission being provided with several selectively actuated speed ratios, a manual stick shift for change speed ratios in said transmission;
   b. predicting a zero torque parameter value for said engine based on system variables;

c. modifying said engine parameter by said engine control to achieve said zero torque value; and d. manually moving said transmission out of engagement to a neutral position.

18. A method as recited in claim 17, wherein said predicted value is based at least in part on engine speed.

19. A method as recited in claim 17, wherein said engine parameter is adjusted above and below said zero torque value as a function of time.

20. A method as recited in claim 17, wherein said zero torque parameter is predicted based upon the acceleration of the transmission output speed.

* * * * *

UNITED STATES PATENT AND TRADEMARK OFFICE
CERTIFICATE OF CORRECTION

PATENT NO.    : 5,573,477
DATED         : November 12, 1996
INVENTOR(S)   : Desautels et al.

It is certified that error appears in the above-identified patent and that said Letters Patent is hereby corrected as shown below:

<u>Title page,</u>
Item [73], should read:
-- [73] Assignee:   Rockwell International Corporation
Pittsburgh, PA

Detroit Diesel Corporation
Detroit, MI --

Signed and Sealed this

Twenty-first Day of January, 2003

JAMES E. ROGAN
*Director of the United States Patent and Trademark Office*